United States Patent
Suga et al.

(10) Patent No.: US 12,091,504 B2
(45) Date of Patent: Sep. 17, 2024

(54) POLYETHER ETHER KETONE, COMPOSITION, AND SHEET

(71) Applicant: IDEMITSU KOSAN CO., LTD., Tokyo (JP)

(72) Inventors: Koichi Suga, Sodegaura (JP); Minoru Senga, Sodegaura (JP); Hiromu Kumagai, Sodegaura (JP); Yuko Murakami, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/024,250

(22) PCT Filed: Sep. 2, 2021

(86) PCT No.: PCT/JP2021/032222
§ 371 (c)(1),
(2) Date: Mar. 1, 2023

(87) PCT Pub. No.: WO2022/050332
PCT Pub. Date: Mar. 10, 2022

(65) Prior Publication Data
US 2024/0026077 A1    Jan. 25, 2024

(30) Foreign Application Priority Data
Sep. 2, 2020  (JP) .................. 2020-147624

(51) Int. Cl.
*C08G 65/40*    (2006.01)
*C08J 5/18*    (2006.01)
*C08K 7/06*    (2006.01)
*C08K 7/14*    (2006.01)

(52) U.S. Cl.
CPC ............ *C08G 65/4012* (2013.01); *C08J 5/18* (2013.01); *C08K 7/06* (2013.01); *C08K 7/14* (2013.01); *C08G 2650/40* (2013.01); *C08J 2371/10* (2013.01)

(58) Field of Classification Search
CPC ............... C08G 65/4087; C08G 65/40; C08G 65/4012; C08J 5/18; C08J 2371/10; C08K 7/06; C08K 7/14
See application file for complete search history.

(56) References Cited

U.S. PATENT DOCUMENTS 4,952,665 A    8/1990    Ebata et al.

FOREIGN PATENT DOCUMENTS

| | | |
|---|---|---|
| CN | 104479089 A | 4/2015 |
| JP | S62-148524 A | 7/1987 |
| JP | S64-065129 A | 3/1989 |
| JP | H03-122120 A | 5/1991 |

OTHER PUBLICATIONS

Trivedi et al., Derwent EP 2067823, Oct. 2009.*
Office Action, dated Sep. 28, 2023, issued in corresponding Chinese Patent Application No. 202180060621.7.
International Search Report and Translation of International Preliminary Report on Patentability issued in connection with PCT Appl. Ser. No. PCT/JP2021/032222 dated Nov. 16, 2021.

* cited by examiner

*Primary Examiner* — Shane Fang
(74) *Attorney, Agent, or Firm* — Foley & Lardner LLP

(57) ABSTRACT

Provided is a polyether ether ketone, comprising a repeating unit represented by the following formula (1), satisfying one or both of the following conditions (A) and (B), and having a hydroxy group at one terminal or both terminals of a main chain of the polyether ether ketone: (A) a fluorine atom content a is less than 2 mg/kg; and (B) a chlorine atom content b is 2 mg/kg or more.

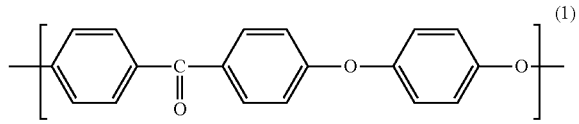

8 Claims, No Drawings

POLYETHER ETHER KETONE, COMPOSITION, AND SHEET

CROSS-REFERENCE TO RELATED APPLICATIONS

The present application claims priority under 35 U.S.C. § 371 to International Patent Application No. PCT/JP2021/032222, filed Sep. 2, 2021, which claims priority to and the benefit of Japanese Patent Application No. 2020-147624, filed on Sep. 2, 2020. The contents of these applications are hereby incorporated by reference in their entireties.

TECHNICAL FIELD

The present invention relates to a polyether ether ketone, a composition, and a sheet.

Specifically, the present invention relates to a polyether ether ketone capable of exhibiting excellent mechanical strength by being blended with an inorganic compound, a composition, and a sheet.

BACKGROUND ART

A polyether ether ketone (hereinafter, the polyether ether ketone is also referred to as "PEEK") has been known as a representative resin of an engineering plastic.

In general, 4,4'-difluorobenzophenone that is said to have high reactivity and hydroquinone have been used as raw materials at the time of the production of the PEEK.

Meanwhile, in Patent Literature 1,4,4'-dichlorobenzophenone and hydroquinone are used as raw materials at the time of the production of the PEEK while the following condition is regarded as essential: a mixed solvent of 100 parts by mass of an aromatic sulfone and 1 part by mass to 20 parts by mass of a solvent having a boiling point of 270° C. to 330° C. is used.

In addition, in Patent Literature 2,4,4'-dichlorobenzophenone and hydroquinone are used as raw materials at the time of the production of the PEEK while the following condition is regarded as essential: the production is performed in the presence of one or more of alkali metal fluorides selected from the group consisting of: sodium fluoride; potassium fluoride; rubidium fluoride; and cesium fluoride.

CITATION LIST

Patent Literature

[PTL 1] JP H03-122120 A
[PTL 2] JP S64-65129 A

SUMMARY OF INVENTION

Technical Problem

However, the PEEK according to the related art typified by Patent Literature 1 or 2 has been found to be susceptible to further improvement from the viewpoint of improving its mechanical strength.

An object of the present invention is to provide a polyether ether ketone capable of exhibiting excellent mechanical strength by being blended with an inorganic compound, a composition, and a sheet.

The inventors of the present invention have made extensive investigations, and as a result, have found that the blending of a specific PEEK with an inorganic compound exhibits excellent mechanical strength. Thus, the inventors have completed the present invention.

According to the present invention, there can be provided the following polyether ether ketone and the like.

1. A polyether ether ketone, comprising a repeating unit represented by the following formula (1), satisfying one or both of the following conditions (A) and (B), and having a hydroxy group at one terminal or both terminals of a main chain of the polyether ether ketone:

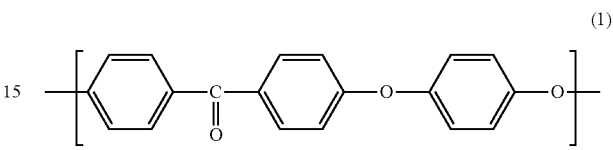

(A) a fluorine atom content a is less than 2 mg/kg; and
(B) a chlorine atom content b is 2 mg/kg or more.

2. The polyether ether ketone according to 1, wherein a raw material of the polyether ether ketone comprises 4,4'-dichlorobenzophenone.
3. The polyether ether ketone according to 1 or 2, having an area ratio of a peak at an α-position of the hydroxy group to a main chain peak in $^1$H-NMR measurement of 0.10% to 2.00%.
4. The polyether ether ketone according to any one of 1 to 3, having a reduced viscosity $\eta_{sp}/c$ of 0.40 dl/g to 1.00 dl/g.
5. A composition, comprising:
a polyether ether ketone comprising a repeating unit represented by the following formula (1), and satisfying one or both of the following conditions (A) and (B); and
an inorganic compound:

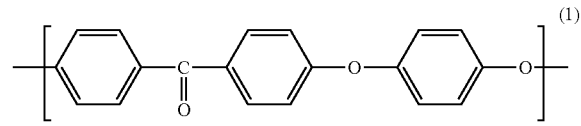

(A) a fluorine atom content a is less than 2 mg/kg; and
(B) a chlorine atom content b is 2 mg/kg or more.

6. The composition according to 5, wherein the polyether ether ketone has a hydroxy group at one terminal or both terminals of a main chain of the polyether ether ketone.
7. The composition according to 5 or 6, wherein the polyether ether ketone has an area ratio of a peak at an α-position of a hydroxy group to a main chain peak in $^1$H-NMR measurement of 0.10% to 2.00%.
8. The composition according to any one of 5 to 7, wherein the polyether ether ketone has a reduced viscosity $\eta_{sp}/c$ of 0.40 dl/g to 1.00 dl/g.
9. The composition according to any one of 5 to 8, wherein the inorganic compound is one or more selected from the group consisting of: glass fibers; carbon fibers; and boron nitride.
10. The composition according to any one of 5 to 9, wherein the inorganic compound is one or more selected from the group consisting of: glass fibers; and carbon fibers, and the form of the inorganic compound is one or more selected from the group consisting of: a chopped strand; a roving; a woven fabric; a nonwoven fabric; and a unidirectional material.

11. The composition according to any one of 5 to 10, wherein the inorganic compound is glass fibers.

12. A sheet, comprising:
a cloth comprising an inorganic compound; and
the polyether ether ketone of any one of 1 to 4 impregnated into the cloth.

13. The sheet according to 12, wherein the cloth is a unidirectional material.

14. The sheet according to 12 or 13, wherein the cloth comprises one or more selected from the group consisting of: glass fibers; and carbon fibers.

According to the present invention, the polyether ether ketone capable of exhibiting excellent mechanical strength by being blended with an inorganic compound, the composition, and the sheet can be provided.

DESCRIPTION OF EMBODIMENTS

A polyether ether ketone, a composition, and a sheet of the present invention are described in detail below.

The expression ""x" to "y"" as used herein represents the numerical range of "from "x" or more to "y"or less." An upper limit value and a lower limit value described for the numerical range may be arbitrarily combined.

In addition, two or more embodiments that are not contrary to each other out of the individual embodiments of an aspect according to the present invention to be described below may be combined, and an embodiment in which the two or more embodiments are combined is also an embodiment of the aspect according to the present invention.

1. Polyether Ether Ketone

A PEEK according to one aspect of the present invention comprises a repeating unit represented by the following formula (1), satisfies one or both of the following conditions (A) and (B), and has a hydroxy group at one terminal or both terminals of a main chain of the PEEK:

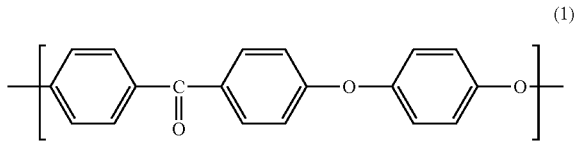

(1)

(A) a fluorine atom content a is less than 2 mg/kg; and
(B) a chlorine atom content b is 2 mg/kg or more.

The PEEK according to this aspect is capable of exhibiting excellent mechanical strength by being blended with an inorganic compound.

Although the reason why such effect is exhibited is not necessarily clear, for example, the following assumption is made: the hydroxy group of the PEEK brings an interface between the PEEK and the inorganic compound into a state suitable for the exhibition of the excellent mechanical strength.

The term "mechanical strength" as used herein may refer to, for example, tensile strength.

In one embodiment, the PEEK according to this aspect has an area ratio of a peak at the α-position of the hydroxy group to a main chain peak in $^1$H-NMR measurement (hereinafter sometimes simply referred to as "area ratio X") of 0.10% to 2.00%.

The area ratio X is a value determined by $^1$H-NMR measurement described in Examples. At the time of the determination of the area ratio X, the area of the main chain peak is determined as a value obtained by: connecting an intensity at a chemical shift of 7.32 ppm and an intensity at a chemical shift of 7.36 ppm to each other with a straight line (baseline); and integrating a range surrounded by the baseline and the peak. In addition, the area of the peak at the α-position of the hydroxy group is determined as a value obtained by: connecting an intensity at a chemical shift of 6.98 ppm and an intensity at a chemical shift of 7.03 ppm to each other with a straight line (baseline); and integrating a range surrounded by the baseline and the peak.

In one embodiment, the PEEK according to this aspect is formed of one kind of PEEK having an equal area ratio X.

In one embodiment, the PEEK according to this aspect is a mixture of two or more of PEEKs different from each other in area ratio X. In this case, in the $^1$H-NMR measurement of the mixture, the area ratio X is 0.10% to 2.00%. Herein, the two or more of PEEKs may comprise a PEEK having an area ratio X of 0%, or may be free of such PEEK.

In one embodiment, the area ratio X is 0.10% or more, 0.12% or more, or 0.14% or more, and is 2.0% or less, 1.8% or less, or 1.6% or less. In addition, the area ratio X may be, for example, 0.10% to 2.0%, 0.12% to 1.8%, or 0.14% to 1.6%. Thus, the effect of the present invention is satisfactorily exhibited.

In one embodiment, the area ratio X can be set to 0.10% to 2.00% by bringing the molar ratio of 4,4'-dichlorobenzophenone to hydroquinone closer to 1.00 at the time of the synthesis of the PEEK through use of 4,4'-dichlorobenzophenone and hydroquinone.

In one embodiment, the area ratio X can be set to 0.10% to 2.00% as follows: at the time of the synthesis of the PEEK through use of 4,4'-dichlorobenzophenone and hydroquinone, a reaction time is adjusted so that a reaction may be stopped under a state in which a Cl terminal of 4,4'-dichlorobenzophenone and a OH terminal of hydroquinone do not completely react with each other.

The fluorine atom content a and chlorine atom content b of the PEEK are values measured by combustion ion chromatography described in Examples.

In one embodiment, the fluorine atom content a of the PEEK is less than 2 mg/kg. Thus, the effect of the present invention is satisfactorily exhibited. The lower limit of the content is not particularly limited, and may be, for example, 0 mg/kg.

Herein, the fluorine atom content a is the sum of the content a1 of a fluorine atom incorporated into the molecular structure of the PEEK and the content a2 of a fluorine atom incorporated as a component (free component) that is not incorporated into the molecular structure of the PEEK.

In one embodiment, the fluorine atom content a of the PEEK can be set to less than 2 mg/kg by refraining from the use of a fluorine atom-containing raw material (e.g., 4,4'-difluorobenzophenone) at the time of the synthesis of the PEEK, or by reducing the usage amount of the fluorine atom-containing raw material at the time of the synthesis of the PEEK.

In one embodiment, the free component in the fluorine atom content a2 is one or both of potassium fluoride and 4,4'-difluorobenzophenone.

In one embodiment, the chlorine atom content b of the PEEK is 2 mg/kg or more, 10 mg/kg or more, 100 mg/kg or more, 500 mg/kg or more, 700 mg/kg or more, 1,000 mg/kg or more, 2,000 mg/kg or more, 3,000 mg/kg or more, or 4,000 mg/kg or more. Thus, the effect of the present invention is satisfactorily exhibited. The upper limit of the content is not particularly limited, and may be, for example, 10,000 mg/kg or less, 9,000 mg/kg or less, 8,000 mg/kg or less, 7,000 mg/kg or less, or 6,000 mg/kg or less.

In addition, the chlorine atom content b of the PEEK is, for example, 2 mg/kg to 10,000 mg/kg, preferably 700 mg/kg to 9,000 mg/kg, more preferably 1,000 mg/kg to 8,000 mg/kg.

Herein, the chlorine atom content b is the sum of the content b1 of a chlorine atom incorporated into the molecular structure of the PEEK and the content b2 of a chlorine atom incorporated as a component (free component) that is not incorporated into the molecular structure of the PEEK.

In one embodiment, the chlorine atom content b of the PEEK can be set to 2 mg/kg or more by incorporating 4,4'-dichlorobenzophenone as a raw material at the time of the synthesis of the PEEK. In addition, the chlorine atom content b of the PEEK can be increased in the range of 2 mg/kg or more by using 4,4'-dichlorobenzophenone and hydroquinone as raw materials at the time of the synthesis of the PEEK, and increasing the ratio of the usage amount of 4,4'-dichlorobenzophenone to the usage amount of hydroquinone.

In one embodiment, the chlorine atom content b1 is 0 mg/kg or more, 100 mg/kg or more, 200 mg/kg or more, or 400 mg/kg or more. The upper limit of the content is not particularly limited, and may be, for example, 10,000 mg/kg or less, 9,000 mg/kg or less, 8,000 mg/kg or less, or 7,000 mg/kg or less.

In one embodiment, the chlorine atom content b2 is 0 mg/kg or more, 2 mg/kg or more, 5 mg/kg or more, or 10 mg/kg or more. The upper limit of the content is not particularly limited, and may be, for example, 500 mg/kg or less, 400 mg/kg or less, or 300 mg/kg or less.

In one embodiment, the free component in the chlorine atom content b2 is one or both of potassium chloride and 4,4'-dichlorobenzophenone.

The amount of a chlorine atom incorporated as potassium chloride, which is a free component, into the PEEK is determined by the following method.

<Method of Measuring Amount of Chlorine Atom Incorporated as Potassium Chloride, which is Free Component, into PEEK>

A solid sample (PEEK) is pulverized with a blender, and is washed with acetone and water in the stated order, followed by drying with an explosion-proof dryer at 180° C. When a reaction mixture (product) immediately after a reaction for the production of the PEEK is used as a sample, the product is cooled and solidified after the completion of the reaction to be used as the solid sample. The blender to be used is not particularly limited, and for example, 7010HS manufactured by Waring may be used.

About 1 g of the dried sample is weighed, and 100 ml (I: liter) of ultrapure water is added to the sample. The mixture is stirred at a liquid temperature of 50° C. for 20 minutes, and is left standing to cool. After that, the mixture is filtered to be separated into a solid content and an aqueous solution. The aqueous solution is analyzed by ion chromatography, and the amount of a chloride ion in the aqueous solution is determined on the basis of a calibration curve produced from a reference having a known concentration. Conditions for an ion chromatograph are as described below.

<Ion Chromatograph>
Analyzer: Metrohm 940 IC Vario
Column: A guard column (Metrosep A Supp 5 Guard) and a separation column (Metrosep A Supp 4) are used while being linked to each other (both the columns are manufactured by Metrohm AG).
Eluent: $Na_2CO_3$ (1.8 mmol/l)+$NaHCO_3$ (1.7 mmol/l)
Flow rate: 1.0 ml/min
Column temperature: 30° C.
Measurement mode: A suppressor system
Detector: An electric conductivity detector The amount of a chlorine atom incorporated as 4,4'-dichlorobenzophenone, which is a free component, into the PEEK is determined by the following method.

<Method of Measuring Amount of Chlorine Atom Incorporated as 4,4'-Dichlorobenzophenone, which is Free Component, into PEEK>

A solid sample (PEEK) is pulverized with a blender, and is washed with acetone and water in the stated order, followed by drying with an explosion-proof dryer at 180° C. When a reaction mixture (product) immediately after a reaction for the production of the PEEK is used as a sample, the product is cooled and solidified after the completion of the reaction to be used as the solid sample. The blender to be used is not particularly limited, and for example, 7010HS manufactured by Waring may be used.

About 1 g of the dried sample is weighed in a recovery flask, and 10 ml of acetone and a boiling stone are added thereto, followed by heating to reflux in a water bath for 5 hours. The mixture is left standing to cool to room temperature, and then its solid content is removed by filtration. The resultant acetone solution is evaporated to dryness with an evaporator, and then 10 ml of acetone is added with a volumetric pipette to redissolve the residue. The amount (mg/kg) of 4,4'-dichlorobenzophenone in the sample is calculated by subjecting the solution to measurement by gas chromatography. The amount (mg/kg) of the chlorine atom incorporated as 4,4'-dichlorobenzophenone, which is a free component, into the PEEK is converted from the following calculation equation.

Amount (mg/kg) of chlorine atom incorporated as 4,4'-dichlorobenzophenone, which is free component, into PEEK=amount (mg/kg) of 4,4'-dichlorobenzophenone in sample/251.11 (molecular weight of 4,4'-dichlorobenzophenone)×35.45 (atomic weight of chlorine)×2

The quantitative value of 4,4'-dichlorobenzophenone is determined on the basis of a calibration curve produced from a reference having a known concentration. Measurement conditions are described below.

<Gas Chromatograph>
Analyzer: Agilent Technologies 7890B
GC column: Agilent Technologies DB-5MS (length: 30 m, inner diameter: 0.25 mm, thickness: 0.25 μm)
Inlet temperature: 250° C.
Oven temperature: 100° C. (1 min)→30° C./min→250° C. (10 min)
Flow rate: 1 ml/min
Injection amount: 1 μl
Split ratio: 40:1
Detector: FID
Detector temperature: 250° C.

The repeating unit represented by the formula (1) is a linked body of a structural unit represented by the following formula (2) and a structural unit represented by the following formula (3).

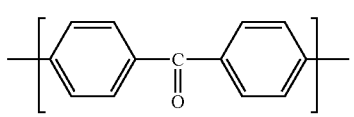

(2)

-continued

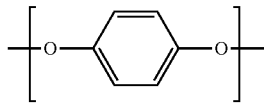
(3)

In the PEEK according to one embodiment, the structural unit represented by the formula (2) is arranged at each of one or more terminals of its molecular chain. In this case, a terminal structure bonded to the structural unit may be a chlorine atom (Cl).

In the PEEK according to one embodiment, the structural unit represented by the formula (3) is arranged at each of one or more terminals of its molecular chain. In this case, a terminal structure bonded to the structural unit may be, for example, a hydrogen atom (H) (when the terminal structure is the hydrogen atom (H), the atom forms a hydroxy group with an oxygen atom (O) in the structural unit).

The terminal structure of the PEEK may be, for example, a structure obtained by substituting the above-mentioned chlorine atom (Cl) or hydroxy group with a hydrogen atom (H) or the like. The terminal structure is not limited to those examples, and may be any structure.

In one embodiment, the PEEK is free of any structural unit other than the repeating unit represented by the formula (1), provided that the PEEK may have a terminal structure at a terminal of its molecular chain as described above.

In one embodiment, the PEEK is free of any structural unit other than the structural units represented by the formula (2) and the formula (3), provided that the PEEK may have a terminal structure at a terminal of its molecular chain as described above.

In one embodiment, the PEEK comprises any structural unit other than the structural units represented by the formula (2) and the formula (3) to the extent that the effect of the present invention is not impaired.

In one embodiment, the total ratio (mass %) of the structural units represented by the formula (2) and the formula (3) in all monomers to be subjected to a reaction is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers.

In one embodiment, a molar ratio ([1A]:[2A]) between the structural unit represented by the formula (2) and the structural unit represented by the formula (3) in the PEEK is 47.5:52.5 to 52.5:47.5, 48.0:52.0 to 52.0:48.0, 48.5:51.5 to 51.5:48.5, 49.0:51.0 to 51.0:49.0, or 49.5:50.5 to 50.5:49.5.

The number of moles of the structural unit represented by the formula (2) may be larger than, smaller than, or identical to the number of moles of the structural unit represented by the formula (3).

When the total ratio of the structural units represented by the formula (2) and the formula (3) in all the monomers for forming the PEEK is 100 mass %, the above-mentioned molar ratio is typically 1:1.

In one embodiment, the melt flow index (abbreviation: "MI": identical in meaning to a melt flow rate (abbreviation: "MFR") described in ASTM D 1238-13) of the PEEK is 1,500 g/10 min or less, 1,000 g/10 min or less, 500 g/10 min or less, 300 g/10 min or less, 200 g/10 min or less, 100 g/10 min or less, 80 g/10 min or less, or 60 g/10 min or less, and is 0.0001 g/10 min or more, 0.0005 g/10 min or more, or 0.001 g/10 min or more.

In addition, the melt flow index of the PEEK is, for example, 0.0001 g/10 min to 1,500 g/10 min, preferably 0.0005 g/10 min to 500 g/10 min, more preferably 0.001 g/10 min to 100 g/10 min.

The melt flow index of the PEEK is preferably 100 g/10 min or less. The PEEK having a melt flow index of 100 g/10 min or less is sufficiently increased in molecular weight, and hence pelletization with, for example, an extruder may be preferably applied thereto.

The melt flow index of the PEEK is a value measured by a method described in Examples.

The melt flow index of the PEEK may be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

The melt flow index of the PEEK may also be measured by the following measurement method, and even when the measurement is performed by the measurement method, a preferred range and the like are as described above.

The melt flow index of the PEEK is measured with a melt indexer (L-220) manufactured by Tateyama Kagaku High-Technologies Co., Ltd. in conformity with JIS K 7210-1: 2014 (ISO 1133-1:2011) under the following measurement conditions.

[Measurement Conditions]
  Measurement temperature (resin temperature): 380° C.
  Measurement load: 2.16 kg
  Cylinder inner diameter: 9.550 mm
  Die inner diameter: 2.095 mm
  Die length: 8.000 mm
  Piston head length: 6.35 mm
  Piston head diameter: 9.474 mm
  Piston weight: 110.0 g (The above-mentioned measurement load comprises the piston weight)
  Operation:

The sample is dried at 150° C. for 2 hours or more in advance. The sample is loaded into the cylinder, and the piston is inserted thereinto, followed by preheating for 6 minutes. The load is applied to the cylinder, and a piston guide is removed, followed by the extrusion of a molten sample from the die. The sample is cut out when the piston moves by a distance in a predetermined range and a predetermined time (t [s]) passes after the start of the movement, and the weight of the sample is measured (m [g]). The MI thereof is determined from the following equation: MI [g/10 min]=600/t×m.

In one embodiment, the reduced viscosity $\eta_{sp}/c$ of the PEEK is 0.36 dl/g or more, more than 0.36 dl/g, 0.37 dl/g or more, 0.38 dl/g or more, 0.39 dl/g or more, 0.40 dl/g or more, 0.46 dl/g or more, or 0.48 dl/g or more, and is 1.50 dl/g or less, 1.30 dl/g or less, or 1.20 dl/g or less.

In addition, a suitable range of the reduced viscosity $\eta_{sp}/c$ of the PEEK is, for example, 0.36 dl/g to 1.50 dl/g, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing more excellent strength while securing appropriate melting fluidity at the time of its molding is obtained.

The reduced viscosity $\eta_{sp}/c$ of the PEEK is a value measured by a method described in Examples. In the method described in Examples, the concentration of the PEEK in a sulfuric acid solution (sample solution) for measurement is 0.1 g/dl.

The reduced viscosity $\eta_{sp}/c$ of the PEEK may be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture. The same holds true for the following reduced viscosity $\eta'_{sp}/c$.

The reduced viscosity $\eta_{sp}/c$ of the PEEK may also be measured by the following measurement method, and even when the measurement is performed by the measurement method, a preferred range and the like are as described above.

The PEEK is dried in a vacuum at 120° C. for 6 hours. Next, the PEEK is dissolved in concentrated sulfuric acid (purity: 98 mass %), and a sample solution is prepared in a measuring flask so that the concentration C [g/dl] of the PEEK may be 0.1 g/dl. Next, the flow time $t_0$ [s] of the solvent (concentrated sulfuric acid (purity: 98 mass %)) and the flow time t [s] of the sample solution are measured in conformity with JIS K 7367-5:2000 (ISO 1628-5:1998) with a thermobath at 25° C. (thermostat for kinematic viscosity measurement (TV-5S manufactured by Thomas Kagaku Co., Ltd.)) and an Ubbelohde viscometer (No. 2), and the reduced viscosity $\eta_{sp}/c$ is determined from the following equation: reduced viscosity $\eta_{sp}/c$ [dl/g]=(t–$t_0$)/($t_0$×C).

In one embodiment, the PEEK has a reduced viscosity $\eta'_{sp}/c$ (not the reduced viscosity $\eta_{sp}/c$ measured by the method described in Examples), which is measured at 25° C. for a sulfuric acid solution (sample solution) obtained by dissolving the PEEK in concentrated sulfuric acid at a concentration of 0.5 g/dl, of more than 0.36 dl/g, 0.37 dl/g or more, 0.38 dl/g or more, 0.39 dl/g or more, 0.40 dl/g or more, 0.46 dl/g or more, 0.48 dl/g or more, 0.50 dl/g or more, or 0.52 dl/g or more, and 1.50 dl/g or less, 1.30 dl/g or less, or 1.20 dl/g or less.

A suitable range of the reduced viscosity $\eta'_{sp}/c$ of the PEEK is, for example, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing more excellent strength while securing appropriate melting fluidity at the time of its molding is obtained.

The reduced viscosity of the PEEK tends to increase as the concentration of the PEEK in the sample solution for measurement becomes higher. For example, when measurement is performed for the same PEEK, the value of its reduced viscosity $\eta'_{sp}/c$ (PEEK concentration: 0.5 g/dl) tends to be larger than the value of its reduced viscosity $\eta_{sp}/c$ (PEEK concentration: 0.1 g/dl). For example, when the reduced viscosity $\eta_{sp}/c$ of the PEEK is 0.36 dl/g, the reduced viscosity $\eta'_{sp}/c$ thereof is assumed to be larger than 0.36 dl/g.

In one embodiment, the intrinsic viscosity $\eta_{inh}$ of the PEEK is 0.47 dl/g or more, 0.48 dl/g or more, 0.49 dl/g or more, or 0.50 dl/g or more, and is 2.00 dl/g or less, 1.80 dl/g or less, 1.50 dl/g or less, 1.30 dl/g or less, or 1.20 dl/g or less.

In addition, a suitable range of the intrinsic viscosity $\eta_{inh}$ of the PEEK is, for example, 0.47 dl/g to 2.00 dl/g, 0.47 dl/g to 1.50 dl/g, 0.48 dl/g to 1.30 dl/g, or 0.50 dl/g to 1.20 dl/g. Thus, a molding material showing more excellent strength while securing appropriate melting fluidity at the time of its molding is obtained.

The intrinsic viscosity $\eta_{inh}$ of the PEEK is a value measured by the following measurement method.

The PEEK is dried in a vacuum at 120° C. for 6 hours. Next, the PEEK is dissolved in concentrated sulfuric acid (purity: 95 mass % or more), and a plurality of sample solutions in which the concentration C [g/dl] of the PEEK is changed are obtained. After that, the flow time $t_0$ [s] of the solvent (concentrated sulfuric acid (purity: 95 mass % or more)) and the flow time t [s] of the sample solution are measured in conformity with JIS K 7367-5:2000 (ISO 1628-5:1998) with a thermobath at 25° C. (thermostat for kinematic viscosity measurement (TV-5S manufactured by Thomas Kagaku Co., Ltd.)) and an Ubbelohde viscometer (No. 2), and the reduced viscosity $\eta_{sp}/c$ is determined from the following equation: reduced viscosity $\eta_{sp}/c$ [dl/g]=(t–$t_0$)/($t_0$×C).

A linear correlation equation is determined by performing two-dimensional plotting in which an axis of abscissa indicates the concentration C [g/dl] of each of the sample solutions and an axis of ordinate indicates the reduced viscosity $\eta_{sp}/c$. The value of the reduced viscosity $\eta_{sp}/c$ at a concentration of zero (intercept) can be determined as the intrinsic viscosity $\eta_{inh}$.

The intrinsic viscosity $\eta_{inh}$ of the PEEK may be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

For example, a pellet comprising the PEEK according to this aspect may be produced by using the PEEK. The pellet may be used as various molding materials requiring heat resistance, solvent resistance, an insulating property, and the like. A molded body may be produced through use of the pellet by a molding method such as injection molding with a mold. In addition, a molded body may be produced through use of the pellet by a molding method, such as extrusion molding, press molding, sheet molding, or film molding.

The applications of the PEEK according to this aspect are not particularly limited. The PEEK is suitable in, for example, aerospace applications, sliding members, such as a gear and a bearing, and various resin compositions.

A molded body comprising the PEEK according to this aspect is suitable as, for example, an aerospace molded body, a molded body for a sliding member, or a filament for a 3D printer. In addition, the molded body comprising the PEEK is suitable as, for example, an aerospace injection-molded body or an injection-molded body for a sliding member.

The PEEK according to one aspect of the present invention described above may be produced by causing 4,4'-dichlorobenzophenone and hydroquinone to react with each other.

4,4'-Dichlorobenzophenone and hydroquinone are monomers for polymerizing a PEEK.

Through a step of causing 4,4'-dichlorobenzophenone and hydroquinone to react with each other, the PEEK can be obtained as a copolymer of these compounds (monomer units).

4,4'-Dichlorobenzophenone and hydroquinone can be easily synthesized, and commercial products are also available.

In the following description, the term "reaction mixture" refers to a reaction system from the start of the reaction between 4,4'-dichlorobenzophenone and hydroquinone to the completion of the reaction, and preferably refers to the form of a solution containing a solvent to be described later in addition to these monomers. The composition of the reaction mixture may vary along with the advance of the reaction. Typically, along with the advance of the reaction, the concentrations of the reactants (4,4'-dichlorobenzophenone and hydroquinone) in the reaction mixture reduce, and hence the concentration of the product (PEEK) increases.

In addition, the "highest temperature" of the reaction mixture is the highest temperature (highest reachable temperature) reached by the reaction mixture in a process from the start of the reaction between 4,4'-dichlorobenzophenone and hydroquinone to the completion of the reaction.

In one embodiment, the highest temperature of the reaction mixture may be 260° C. or more, 265° C. or more, 270° C. or more, 275° C. or more, 280° C. or more, 285° C. or more, 290° C. or more, more than 290° C., 295° C. or more, 300° C. or more, 305° C. or more, 310° C. or more, 315° C. or more, 320° C. or more, 325° C. or more, 330° C. or more, or 335° C. or more. The upper limit of the highest temperature is not particularly limited, and may be, for example, 360° C. or less. In addition, the highest temperature of the reaction mixture is, for example, 260° C. to 360° C., preferably more than 290° C. and 360° C. or less, more preferably 295° C. to 360° C.

In one embodiment, the method of producing a PEEK according to this aspect comprises increasing the temperature of the reaction mixture to 150° C. or more, followed by the holding of the temperature. A temperature at the time of the temperature holding is not particularly limited, and may be, for example, 150° C. to 360° C. The time period for which the temperature holding is performed is not particularly limited, and may be, for example, 0.1 hour to 12 hours.

In one embodiment, the method of producing a PEEK according to this aspect comprises increasing the temperature of the reaction mixture to 150° C. or more, followed by the performance of the increase of the temperature and the holding of the temperature once each, or comprises increasing the temperature thereof to 150° C. or more, followed by the repetition of the temperature increase and the temperature holding a plurality of times. The number of times of repetition is not particularly limited, and may be, for example, 2, 3, 4, 5, 6, 7, 8, 9, or 10.

When the temperature increase and the temperature holding are repeated a plurality of times, the reaction can be efficiently advanced.

In one embodiment, the method of producing a PEEK according to this aspect comprises holding the reaction mixture at 180° C. to 220° C. for 0.5 hour to 2 hours, preferably 0.6 hour to 1.8 hours, more preferably 0.7 hour to 1.5 hours (hereinafter also referred to as "temperature holding (i)"). Thus, the reaction can be accelerated while the volatilization of the raw materials is suppressed, and hence a PEEK having a higher molecular weight can be obtained.

In one embodiment, the method of producing a PEEK according to this aspect comprises holding the reaction mixture at 230° C. to 270° C. for 0.5 hour to 2 hours, preferably 0.6 hour to 1.8 hours, more preferably 0.7 hour to 1.5 hours (hereinafter also referred to as "temperature holding (ii)"). Thus, the reaction can be accelerated while the volatilization of the raw materials is suppressed, and hence a PEEK having a higher molecular weight can be obtained.

In one embodiment, the method of producing a PEEK according to this aspect comprises holding the reaction mixture at 280° C. to 360° C. for 1 hour to 8 hours, preferably 1 hour to 6 hours, more preferably 1 hour to 4 hours (hereinafter also referred to as "temperature holding (iii)"). Thus, a PEEK having a desired molecular weight can be obtained.

In one embodiment, the method of producing a PEEK according to this aspect may comprise two or three selected from the group consisting of the above-mentioned temperature holdings (i) to (iii). The two or three temperature holdings are preferably performed in order of increasing temperature. The method may comprise increasing the temperature of the reaction mixture between the two or three temperature holdings.

A rate of temperature increase when the temperature of the reaction mixture is increased is not particularly limited, and may be, for example, 0.1° C./min to 15° C./min, 0.1° C./min to 10° C./min, 0.1° C./min to 8° C./min, or 0.1° C./min to 5° C./min. Thus, the reaction can be accelerated while the volatilization of the raw materials is suppressed, and hence a PEEK having a higher molecular weight can be obtained.

In one embodiment, in the method of producing a PEEK according to this aspect, a time period from a time point at which the temperature of the reaction mixture reaches 150° C. to a time point at which the temperature reaches the highest temperature is 2.0 hours to 10 hours.

In one embodiment, the reaction mixture contains a solvent. The reaction mixture containing the solvent may be in the form of a solution. The solution may contain 4,4'-dichlorobenzophenone and hydroquinone dissolved in the solvent.

The solvent is not particularly limited, and for example, a neutral polar solvent may be used. Examples of the neutral polar solvent include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethyl sulfoxide, diethyl sulfoxide, 1-methyl-1-oxosulfolane, 1-ethyl-1-oxosulfolane, 1-phenyl-1-oxosulfolane, N,N'-dimethylimidazolidinone, and diphenyl sulfone.

In one embodiment, the reaction mixture contains an aromatic sulfone, and the content of a solvent having a boiling point of 270° C. to 330° C. in the mixture is 0 parts by mass or more and less than 1 part by mass with respect to 100 parts by mass of the aromatic sulfone. Thus, it becomes easier to control a reaction temperature.

The reaction mixture may contain one or two or more of solvents. In particular, the reaction mixture preferably contains only one kind of solvent (single solvent) as a solvent. Thus, a process for the production of the PEEK can be simplified.

In one embodiment, the reaction mixture contains potassium carbonate. Thus, the reaction is accelerated.

In one embodiment, the potassium carbonate satisfies at least one of the following conditions (A) and (B). Thus, the molecular weight of the PEEK to be obtained can be increased:

(A) the bulk density of the potassium carbonate is 1.2 g/ml (l: liter) or less; and
(B) when the average particle diameter and specific surface area of the potassium carbonate are represented by D (μm) and S (m$^2$/g), respectively, D/S≤600 is satisfied.

In one embodiment, the bulk density of the potassium carbonate is 1.2 g/ml or less, 1.1 g/ml or less, or 1.0 g/ml or less, and is 0.05 g/ml or more, or 0.10 g/ml or more.

In addition, the bulk density of the potassium carbonate may be, for example, 0.05 g/ml to 1.2 g/ml, 0.05 g/ml to 1.1 g/ml, 0.05 g/ml to 1.0 g/ml, 0.10 g/ml to 1.2 g/ml, 0.10 g/ml to 1.1 g/ml, or 0.10 g/ml to 1.0 g/ml.

When the bulk density of the potassium carbonate is 1.2 g/ml or less, the molecular weight of the PEEK to be obtained can be increased.

The bulk density of the potassium carbonate is a value measured by the following method.

About 50 g of the potassium carbonate (mass: m (g)) weighed with an accuracy of 0.1 mass % is gently loaded into a 100-milliliter measuring cylinder (minimum scale unit: 1 ml), which has been dried, without being consolidated. The upper surface of a powder layer is carefully leveled without being consolidated, and the loose bulk volume $V_0$ (ml) thereof is read to the minimum scale unit, followed by the calculation of the bulk density from the following equation.

Bulk density(g/ml)=$m/V_0$

When the loose bulk volume $V_0$ is more than 100 ml, the loose bulk volume $V_0$ is adjusted to a volume of 100 ml or less by reducing the mass m of the potassium carbonate to be used as a sample, and the loose bulk volume $V_0$ is read, followed by the calculation of the bulk density.

In one embodiment, when the average particle diameter and specific surface area of the potassium carbonate are represented by D (μm) and S (m$^2$/g), respectively, the value of the ratio D/S is 600 or less, 550 or less, or 500 or less, and is 0.1 or more, 0.2 or more, or 0.5 or more.

In addition, the value of the ratio D/S may be, for example, 1 to 600, 1 to 550, 1 to 500, 2 to 600, 2 to 550, 2 to 500, 5 to 600, 5 to 550, or 5 to 500.

When D/S≤600 is satisfied, the molecular weight of the PEEK to be obtained can be increased.

The average particle diameter D (μm) of the potassium carbonate is a value measured by a method described below.

Particle size distribution measurement is performed with CAMSIZER manufactured by MicrotracBEL Corp. by a dry method. The sample (potassium carbonate) is dropped into the measuring portion of the CAMSIZER with a vibrating feeder, and a picture of its particles is taken with a camera, followed by the measurement of their particle diameters. When an observed image is processed, the average particle diameter D is calculated through use of numerical values, which are obtained by processing data from the short diameters of the particle image, through automatic calculation by a program installed in the measuring apparatus.

The specific surface area S (m$^2$/g) of the potassium carbonate is measured by a method described below.

(i) Pretreatment

As the pretreatment of the sample (potassium carbonate), heat-vacuum evacuation is performed with BELPREP vacll manufactured by MicrotracBEL Corp. at 100° C. for 1 hour or more. When a degree of vacuum of 10 Pa (75 mTorr) is achieved, the pretreatment is judged to be completed.

(ii) Measurement

Specific surface area measurement is performed with BELSORP-minill manufactured by MicrotracBEL Corp. by a nitrogen adsorption method at liquid nitrogen temperature. A nitrogen introduction amount is set in the "easy mode" of the apparatus, and a target relative pressure is set to 0.10, 0.15, 0.20, 0.25, or 0.30.

(iii) Analysis

BEL Master was used as analysis software. An analysis method is in conformity with JIS Z 8830:2013, and the specific surface area S is calculated through use of four or more measurement results at higher relative pressures by a BET multipoint method.

In one embodiment, for example, potassium carbonate having the following values, which are obtained by the above-mentioned measurements, may be used as the potassium carbonate: a bulk density of 0.90 [g/ml], an average particle diameter D of 460 [μm], a specific surface area S of 1.51 [m$^2$/g], and a ratio D/S of 305.

In one embodiment, the reaction mixture contains an alkali metal salt, such as: any alkali metal carbonate other than the potassium carbonate; or an alkali metal hydrogen carbonate. Such alkali metal salt may be used in combination with the potassium carbonate. For example, the potassium carbonate and sodium carbonate may be used in combination.

Examples of the alkali metal carbonate include lithium carbonate, rubidium carbonate, and cesium carbonate.

Examples of the alkali metal hydrogen carbonate that may be used in combination with the potassium carbonate include lithium hydrogen carbonate, sodium hydrogen carbonate, potassium hydrogen carbonate, rubidium hydrogen carbonate, and cesium hydrogen carbonate.

Those alkali metal salts may be used alone or in combination thereof.

The total concentration of the alkali metal salts (including the potassium carbonate and the above-mentioned other alkali metal salt) in the reaction mixture is not particularly limited.

In one embodiment, the total blending amount of the alkali metal salts in the reaction mixture is 100 parts by mol or more with respect to 100 parts by mol of hydroquinone to be blended into the reaction mixture, and is 180 parts by mol or less, 160 parts by mol or less, 140 parts by mol or less, or 120 parts by mol or less with respect thereto. When the total blending amount of the alkali metal salts is 100 parts by mol or more, a reaction time can be shortened. When the total blending amount of the alkali metal salts is 180 parts by mol or less, the production of a gel component can be suppressed. In addition, the total blending amount of the alkali metal salts in the reaction mixture is, for example, 100 parts by mol to 180 parts by mol, preferably 100 parts by mol to 140 parts by mol, more preferably 100 parts by mol to 120 parts by mol with respect to 100 parts by mol of hydroquinone to be blended into the reaction mixture.

In one embodiment, the potassium carbonate is blended as an alkali metal salt in the above-mentioned blending amount.

In one embodiment, the reaction mixture is free of any of sodium fluoride, potassium fluoride, rubidium fluoride, or cesium fluoride. In this aspect, even when none of those compounds is incorporated, a PEEK having a high molecular weight can be obtained. In addition, when none of those compounds is incorporated, the remaining of those compounds in the PEEK to be obtained can be avoided, and hence purification cost can be reduced. Thus, a PEEK capable of exhibiting excellent mechanical strength by being blended with an inorganic compound can be produced at low cost.

A molar ratio ([DCBP]:[HQ]) between 4,4'-dichlorobenzophenone (DCBP) and hydroquinone (HQ) to be subjected to the reaction is not particularly limited.

The molar ratio ([DCBP]:[HQ]) may be appropriately adjusted for the purpose of, for example, controlling the molecular weight of the PEEK to be obtained.

In one embodiment, the molar ratio ([DCBP]:[HQ]) is 47.5:52.5 to 52.5:47.5, 48.0:52.0 to 52.0:48.0, 48.5:51.5 to 51.5:48.5, 49.0:51.0 to 51.0:49.0, or 49.5:50.5 to 50.5:49.5.

The number of moles of 4,4'-dichlorobenzophenone (DCBP) may be larger than, smaller than, or identical to the number of moles of hydroquinone (HQ).

In one embodiment, the total concentration (on a blending amount basis) of 4,4'-dichlorobenzophenone and hydroquinone in the reaction mixture is not particularly limited, and is, for example, 1.0 mol/l or more, 1.2 mol/l or more, 1.3 mol/l or more, 1.4 mol/l or more, or 1.5 mol/l or more, and is 6.0 mol/l or less, 5.0 mol/l or less, or 4.0 mol/l or less. In addition, the total concentration (on a blending amount basis) of 4,4'-dichlorobenzophenone and hydroquinone in the reaction mixture is, for example, 1.0 mol/l to 6.0 mol/l, preferably 1.3 mol/l to 5.0 mol/l, more preferably 1.5 mol/l to 4.0 mol/l.

In one embodiment, no monomer other than 4,4'-dichlorobenzophenone and hydroquinone is used as a monomer to be subjected to the above-mentioned reaction.

In one embodiment, any monomer other than 4,4'-dichlorobenzophenone and hydroquinone is used in combination in the above-mentioned reaction to the extent that the effect of the present invention is not impaired.

In one embodiment, the total ratio (mass %) of 4,4'-dichlorobenzophenone and hydroquinone is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers to be subjected to the reaction.

In one embodiment, 70 mass % or more, 80 mass % or more, 90 mass % or more, 95 mass % or more, 99 mass % or more, 99.5 mass % or more, 99.9 mass % or more, or substantially 100 mass % of the reaction mixture at the time of the start of the reaction is formed of:
- 4,4'-dichlorobenzophenone, hydroquinone, an alkali metal salt, and the solvent;
- 4,4'-dichlorobenzophenone, hydroquinone, one or more of alkali metal salts selected from the group consisting of: potassium carbonate; and sodium carbonate, and diphenyl sulfone; or
- 4,4'-dichlorobenzophenone, hydroquinone, potassium carbonate, and diphenyl sulfone.

When "substantially 100 mass %" of the mixture is formed of those materials, the mixture may contain an inevitable impurity.

The reaction between 4,4'-dichlorobenzophenone and hydroquinone can be performed in an inert gas atmosphere. The inert gas is not particularly limited, and examples thereof include nitrogen and an argon gas.

2. Composition

A composition according to one aspect of the present invention comprises: a PEEK comprising a repeating unit represented by the following formula (1), and satisfying one or both of the following conditions (A) and (B); and an inorganic compound:

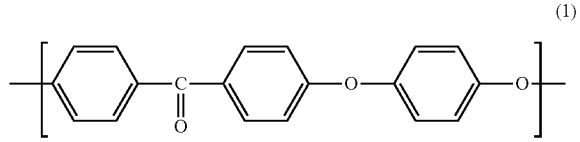

(1)

(A) a fluorine atom content a is less than 2 mg/kg; and
(B) a chlorine atom content b is 2 mg/kg or more.

The composition according to this aspect exhibits excellent mechanical strength.

The description made for the PEEK according to one aspect of the present invention is incorporated for the conditions (A) and (B), and detailed description therefor is omitted herein.

The PEEK to be incorporated into the composition according to this aspect is not particularly limited as long as the composition satisfies one or both of the conditions (A) and (B).

In one embodiment, the PEEK to be incorporated into the composition according to this aspect is the PEEK according to one aspect of the present invention described above. Thus, the composition exhibits more excellent mechanical strength.

In one embodiment, the inorganic compound is one or more selected from the group consisting of: glass fibers; carbon fibers; and boron nitride. Thus, the strength of the composition is further improved.

In one embodiment, the inorganic compound is one or more selected from the group consisting of: glass fibers; and carbon fibers, and the form of the inorganic compound is one or more selected from the group consisting of: a chopped strand; a roving; a woven fabric; a nonwoven fabric; and a unidirectional material (also referred to as "UD material"). Thus, the strength of the composition is further improved.

In one embodiment, the inorganic compound is glass fibers.

In one embodiment, the composition may be a fiber composite material comprising: the PEEK serving as a matrix; and a fibrous inorganic compound, such as glass fibers or carbon fibers. The fiber composite material may be a so-called fiber-reinforced thermoplastic (FRTP).

The fibrous inorganic compound may be treated with a sizing agent. The sizing agent can unite the fibrous inorganic compound into a bundle shape. The fibrous inorganic compound treated with the sizing agent has the sizing agent adhering to its surface. The sizing agent is not particularly limited, and examples thereof include an epoxy-based sizing agent, a urethane-based sizing agent, and a polyamide-based sizing agent. In addition, the PEEK according to one aspect of the present invention may be used as the sizing agent. Those sizing agents may be used alone or in combination thereof. A compound that is not treated with any sizing agent may be used as the fibrous inorganic compound.

In one embodiment, the inorganic compound is an inorganic compound having a reinforcing action on the PEEK. The term "inorganic compound having a reinforcing action on the PEEK" as used herein refers to the following inorganic compound: a tensile strength when 43 parts by mass of the inorganic compound is uniformly formulated into 100 parts by mass of the PEEK becomes larger than the tensile strength of the PEEK that is free of the inorganic compound. The tensile strength is measured by a method described in Examples.

The content of the inorganic compound in the composition is not particularly limited.

In one embodiment, the content of the inorganic compound in the composition is, for example, 5 parts by mass or more, 10 parts by mass or more, or 20 parts by mass or more with respect to 100 parts by mass of the PEEK, and is 60 parts by mass or less, 55 parts by mass or less, or 50 parts by mass or less with respect thereto. The upper limit and lower limit of the content may be arbitrarily combined with each other.

The composition may comprise any component other than the PEEK and the inorganic compound. The other component is not particularly limited, and is, for example, any other resin that is not the PEEK. Examples of the other resin include fluorine resins such as polytetrafluoroethylene. The other components may be used alone or in combination thereof.

In one embodiment, 50 mass % or more, 60 mass % or more, 70 mass % or more, 80 mass % or more, 90 mass % or more, 95 mass % or more, 97 mass % or more, 99 mass % or more, 99.5 mass % or more, or substantially 100 mass % of the composition is formed of:
- the PEEK;
- the PEEK and the inorganic compound;
- the PEEK and the above-mentioned other component; or
- the PEEK, the inorganic compound, and the above-mentioned other component.

When "substantially 100 mass %" of the composition is formed of those components, the composition may contain an inevitable impurity.

A method of preparing the composition is not particularly limited, and examples thereof comprise mixing with a known mixer, and melting and kneading with an extruder or the like. The inorganic compound may be side-fed to the PEEK with a twin-screw kneader.

A pellet of the composition may be produced. The pellet may be used as a raw material for producing a molded body.

In one embodiment, a method of producing the pellet comprises: cutting the fibrous inorganic compound into a short length to provide chopped strands; and then adding the PEEK to the short fibers. The pellet (also referred to as "short-fiber pellet") may be produced by mixing the short fibers and the PEEK, and granulating the mixture.

In one embodiment, the method of producing the pellet comprises: immersing the roving of the fibrous inorganic compound in the PEEK that has been melted, followed by pultrusion molding; and then cutting the resultant into a desired pellet length to produce the pellet (also referred to as "long-fiber pellet"). When the long-fiber pellet is produced as described above, the breakage of the fibrous inorganic compound can be suppressed.

The molding of the composition (that may be in the form of the above-mentioned pellet) can produce a molded body. A known method, such as injection molding, extrusion molding, or blow molding, may be used in the molding. In addition, the composition may be subjected to press molding, and a known method, such as a cold pressing method or a hot pressing method, may be used. Further, the following may be performed: the composition is used as a resin composition for a 3D printer, and is molded with a 3D printer.

In one embodiment, the tensile strength of the composition is 76 MPa or more, 78 MPa or more, 80 MPa or more, 82 MPa or more, 84 MPa or more, 86 MPa or more, 88 MPa or more, 89 MPa or more, 90 MPa or more, 91 MPa or more, or 92 MPa or more. Thus, the composition may be more suitably used in an application where mechanical strength is required. The upper limit of the strength is not particularly limited, and is, for example, 300 MPa or less, 200 MPa or less, 180 MPa or less, 150 MPa or less, 130 MPa or less, or 120 MPa or less.

The tensile strength of the composition is, for example, 76 MPa to 300 MPa, preferably 80 MPa to 200 MPa, more preferably 90 MPa to 180 MPa.

The tensile strength of the composition is a value measured by a method described in Examples.

3. Sheet

A sheet according to one aspect of the present invention comprises: a cloth comprising an inorganic compound; and the PEEK impregnated into the cloth. According to such sheet, excellent mechanical strength is exhibited as in the case where the inorganic compound is formulated into the PEEK.

The cloth is not particularly limited, and only needs to comprise the fibers of the inorganic compound. In one embodiment, the cloth is constituted by fibers arranged in a planar manner. The cloth may be, for example, a woven fabric, a nonwoven fabric, or a unidirectional material.

The unidirectional material is constituted by fibers paralleled in one direction.

The fibers in the cloth are not particularly limited.

The cloth preferably contains one or more selected from the group consisting of: glass fibers; and carbon fibers. In one embodiment, the cloth contains glass fibers.

In one embodiment, the sheet may be a fiber composite material comprising: the PEEK serving as a matrix; and a fibrous inorganic compound, such as glass fibers or carbon fibers. Such fiber composite material may be a so-called fiber-reinforced thermoplastic (FRTP). For example, the use of a unidirectional material as the cloth provides a unidirectional fiber-reinforced plastic.

In the sheet according to one embodiment, a space between the fibers in the cloth is impregnated with the PEEK. The cloth may be a single cloth, or may be a laminate obtained by laminating two or more cloths. When the cloth is a laminate, the PEEK can contribute to bonding between the cloths.

The sheet may comprise any other component in addition to the PEEK and the cloth. The components described for the composition may each be used as the other component.

In one embodiment, 50 mass % or more, 60 mass % or more, 70 mass % or more, 80 mass % or more, 90 mass % or more, 95 mass % or more, 97 mass % or more, 99 mass % or more, 99.5 mass % or more, or substantially 100 mass % of the sheet is formed of:
- the PEEK and the cloth; or
- the PEEK, the cloth, and the above-mentioned other component.

When "substantially 100 mass %" of the sheet is formed of those components, the sheet may contain an inevitable impurity.

A method of producing the above-mentioned sheet is not particularly limited.

In one embodiment, the method of producing the sheet comprises immersing the cloth in the PEEK. In this case, the immersion may be performed by, for example, applying, to carbon fibers, a solution obtained by dissolving the PEEK in an appropriate solvent, a mixture obtained by mixing the PEEK into an appropriate vehicle, or a molten product of the PEEK.

In one embodiment, the method of producing the sheet comprises producing the cloth from fibers united with a sizing agent containing the PEEK.

In one embodiment, the method of producing the sheet comprises laminating a film containing the PEEK on the cloth, followed by the melt pressing of the laminate.

In one embodiment, the method of producing the sheet comprises directly adding the powder of the PEEK to the cloth, followed by the melting of the powder.

In the foregoing description concerning the method of producing the sheet, the cloth into which the PEEK is impregnated may be the above-mentioned laminate.

In one embodiment, the sheet is a planar shape over its entire surface.

In one embodiment, a three-dimensional shape is imparted to the sheet. The fact that the shape of the sheet is "three-dimensional" means that the sheet comprises a curved portion (comprising a bent portion).

A method of producing the sheet having imparted thereto the three-dimensional shape is not particularly limited.

In one embodiment, the method of producing the sheet having imparted thereto the three-dimensional shape comprises impregnating the cloth having imparted thereto the three-dimensional shape with the PEEK.

In one embodiment, the method of producing the sheet having imparted thereto the three-dimensional shape comprises: impregnating the cloth with the PEEK to provide a sheet (e.g., a planar sheet); and then performing molding so that the three-dimensional shape may be imparted to the sheet. The molding may be performed by, for example, applying a pressure to the sheet under heating.

In the foregoing description concerning the sheet, the PEEK may be impregnated as the composition according to one aspect of the present invention described above into the cloth. In this case, the composition may or may not comprise the inorganic compound.

EXAMPLES

Examples of the present invention are described below, but the present invention is not limited by these Examples.

Example 1

40.613 g (0.162 mol) of 4,4'-dichlorobenzophenone, 17.809 g (0.162 mol) of hydroquinone, 25.704 g (0.186 mol) of potassium carbonate, and 140.01 g of diphenyl sulfone were loaded into a 300-milliliter four-necked flask including a stirring machine, a temperature gauge, a nitrogen-introducing tube, a cooling tube, and a water recovery vessel connected thereto, and a nitrogen gas was flowed therein.

The reaction mixture was subjected to a reaction under the following temperature control.

<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. (rate of temperature increase: 1.7° C./min).
(4) The mixture is held at 250° C. for 1 hour.
(5) The temperature is increased from 250° C. to 340° C. (highest temperature of the reaction mixture) (rate of temperature increase: 3.0° C./min).
(6) The mixture is held at 340° C. (highest temperature of the reaction mixture) for 2 hours.

After the completion of the reaction, the product was pulverized with a blender (7010HS manufactured by Waring), and was washed with acetone and water in the stated order, followed by drying with a dryer at 180° C. Thus, a powdery PEEK was obtained.

The resultant PEEK was subjected to the following measurements (1) to (5).

(1) Melt Flow Index (MI)

The melt flow index of the PEEK was measured with a melt indexer (L-227) manufactured by Tateyama Kagaku High-Technologies Co., Ltd. in conformity with ASTM D 1238-13 at a resin temperature of 380° C. and a load of 2.16 kg.

(2) $^1$H-NMR Measurement (Area Ratio X)

The PEEK was subjected to $^1$H-NMR measurement, and the ratio (area ratio X) of the area of a peak at the α-position of a hydroxy group (area in the chemical shift range of from 6.98 ppm to 7.03 ppm) to the area of a main chain peak (area in the chemical shift range of from 7.32 ppm to 7.36 ppm) was determined from the following equation.

Area ratio $X$[%]=(area of peak at α-position of hydroxy group/area of main chain peak)×100

Measurement conditions for the $^1$H-NMR measurement are as described below.

<Measurement Conditions for $^1$H-NMR Measurement>
NMR apparatus: Ascend 500 manufactured by Bruker Japan K.K.
Probe: A 5 mmφ TCI cryoprobe
NMR sample tube diameter: 5 mmφ
Sample solution preparation: A sample solution was obtained by: adding 0.6 ml of methanesulfonic acid to about 20 mg of the sample; stirring the mixture at room temperature for 1 hour; then adding 0.4 ml of deuterated dichloromethane to the mixture; and further stirring the whole for 30 minutes at room temperature to dissolve the sample.
Observation range: 20 ppm
Observation center: 6.175 ppm
Number of data points: 64 kB
Pulse repetition time: 10 seconds
Number of scans: 256 times
Flip angle: 30°
Measurement temperature: 25° C.
Chemical shift reference: The position of a central peak out of the three peaks of deuterated dichloromethane is set to 5.32 ppm.

(3) Combustion Ion Chromatography

A fluorine atom content a and a chlorine atom content b in the PEEK were measured by combustion ion chromatography.

Specifically, the sample was introduced into a combustion furnace, and was combusted in a combustion gas containing oxygen, followed by the collection of a generated gas in an absorbing liquid. After that, the absorbing liquid was subjected to separation and quantification with an ion chromatograph. A quantitative value was determined on the basis of a calibration curve produced from a reference having a known concentration. Measurement conditions are described below.

<Sample Combustion>
Combustion apparatus: AQF-2100H manufactured by Mitsubishi Chemical Analytech Co., Ltd.
Combustion furnace preset temperature: 800° C. on the front stage and 1,100° C. on the rear stage
Argon flow rate: 400 ml/min
Oxygen flow rate: 200 ml/min
Absorbing liquid: A hydrogen peroxide solution <Ion Chromatograph>
Analyzer: Integrion manufactured by Thermo Fisher Scientific, Inc.
Column: A guard column (Dionex IonPac AG12A) and a separation column (Dionex IonPac AS12A) are used while being linked to each other (both the columns are manufactured by DIONEX).
Eluent: $Na_2CO_3$ (2.7 mmol/l)+$NaHCO_3$ (0.3 mmol/l)
Flow rate: 1.5 ml/min
Column temperature: 30° C.
Measurement mode: A suppressor system
Detector: An electric conductivity detector The detection limit of each of a fluorine atom and a chlorine atom in the above-mentioned measurement method is 2 mg/kg. When the contents of those atoms are less than the detection limit, the contents are each represented as "<2" (mg/kg) in Table 1 (the same holds true for Table 2 subsequent thereto).

(4) Reduced Viscosity $\eta_{sp}/c$

The reduced viscosity $\eta_{sp}/c$ of a solution, which was obtained by dissolving the PEEK in concentrated sulfuric acid (purity: 95 mass % or more) so that its concentration became 0.1 g/dl, was measured at 25° C. with an Ubbelohde viscometer in conformity with JIS K 7367-5:2000.

(5) Reinforcement with Inorganic Compound (Measurement of Tensile Strength)

100 Parts by mass of the resultant PEEK and 43 parts by mass of an inorganic compound (glass fibers; "T-786H" manufactured by Nippon Electric Glass Co., Ltd., average fiber diameter: 10 μm, average fiber length: 3.0 mm) were kneaded with PLASTI-CORDER manufactured by Brabender GmbH & Co. KG at 380° C. for 5 minutes to provide a composition.

The resultant composition was subjected to press molding into a thickness of 2 mm with a vacuum press manufactured by Imoto Machinery Co., Ltd. at 380° C., and was annealed at 200° C. to provide a press-molded plate. The press-molded plate was cut into a dumbbell 5A shape specified in JIS K 7161 to be used as a test piece. The tensile strength of the resultant test piece was measured by subjecting the test piece to a tensile test at a test speed of 5 mm/min and a chuck-to-chuck distance of 50 mm.

The foregoing results are shown in Table 1.

Example 2

A PEEK was obtained in the same manner as in Example 1 except that in the washing after the completion of the reaction in Example 1, the pulverized product was washed with acetone, water, and N-methyl-2-pyrrolidone in the stated order. The resultant PEEK was subjected to the same measurements as those of Example 1. The results are shown in Table 1.

Example 3

A PEEK was obtained in the same manner as in Example 1 except that in Example 1, the formulation of the reaction mixture was changed to 52.499 g (0.209 mol) of 4,4'-dichlorobenzophenone, 22.464 g (0.204 mol) of hydroquinone, 32.4324 g (0.235 mol) of potassium carbonate, and 120.02 g of diphenyl sulfone. The resultant PEEK was subjected to the same measurements as those of Example 1. The results are shown in Table 1.

Example 4

A PEEK was obtained in the same manner as in Example 1 except that in Example 1, the blending amount of 4,4'-dichlorobenzophenone was changed to 41.224 g (0.164 mol), and the highest temperature of the reaction mixture was changed to 280° C. The resultant PEEK was subjected to the same measurements as those of Example 1. The results are shown in Table 1.

Example 5

A PEEK was obtained in the same manner as in Example 1 except that in Example 1, the blending amount of 4,4'-dichlorobenzophenone was changed to 41.209 g (0.164 mol), and the highest temperature of the reaction mixture was changed to 300° C. The resultant PEEK was subjected to the same measurements as those of Example 1. The results are shown in Table 1.

Comparative Example 1

The reinforcement of the PEEK obtained in Example 5 with the inorganic compound was omitted, and the PEEK alone was subjected to the same tensile strength measurement as that of Example 1.

Specifically, the PEEK obtained in Example 5 was subjected to press molding into a thickness of 2 mm with a vacuum press manufactured by Imoto Machinery Co., Ltd. at 380° C., and was annealed at 200° C. to provide a press-molded plate. The press-molded plate was cut into a dumbbell 5A shape specified in JIS K 7161 to be used as a test piece. The tensile strength of the resultant test piece was measured by subjecting the test piece to a tensile test at a test speed of 5 mm/min and a chuck-to-chuck distance of 50 mm.

The results are shown in Table 1.

TABLE 1

| | Example 1 | Example 2 | Example 3 | Example 4 | Example 5 | Comparative Example 1 |
|---|---|---|---|---|---|---|
| MI [g/10 min] | 31.3 | 33.0 | 25.5 | 51.3 | 34.0 | 34.0 |
| Area ratio X [%] | 0.44 | 0.35 | 0.24 | 0.16 | 0 | 0 |
| Fluorine atom content [mg/kg] | <2 | <2 | <2 | <2 | <2 | <2 |
| Chlorine atom content [mg/kg] | 600 | 670 | 3,400 | 5,600 | 4,500 | 4,500 |
| Reduced viscosity $\eta_{sp/c}$ [dl/g] | 0.60 | 0.58 | 0.58 | 0.45 | 0.59 | 0.59 |
| Tensile strength after reinforcement with inorganic compound [MPa] | 119 | 101 | 95 | 93 | 88 | — |
| Tensile strength of PEEK alone [MPa] | — | — | — | — | — | 75 |

Synthesis Example 1

A powdery PEEK was obtained in the same manner as in Example 1 except that in Example 1, a 2-liter reaction vessel (comprising a stirring machine, a temperature gauge, a nitrogen-introducing tube, a cooling tube, and a water recovery vessel connected thereto) was used instead of the 300-milliliter four-necked flask, and 284.30 g (1.132 mol) of 4,4'-dichlorobenzophenone, 124.66 g (1.132 mol) of hydroquinone, 179.91 g (1.302 mol) of potassium carbonate, and 980.01 g of diphenyl sulfone were loaded into the reaction vessel to provide a reaction mixture.

The melt flow index (MI), area ratio X, chlorine atom content b, and reduced viscosity $\eta_{sp}/c$ of the resultant PEEK were each measured in the same manner as in Example 1. The results were as described below.

MI: 42 g/10 min
Area ratio X: 1.22%
Chlorine atom content: 1,400 mg/kg
Reduced viscosity $\eta_{sp}/c$: 0.52 dl/g Some embodiments and/or Examples of the present invention are described in detail above, but a person skilled in the art could easily make various modifications to these illustrative embodiments and/or Examples without substantially departing from the novel teachings and effects of the present invention. Accordingly, those various modifications are encompassed in the scope of the present invention.

The invention claimed is:

1. A composition, comprising:
a polyether ether ketone, comprising a repeating unit represented by the following formula (1), satisfying one or both of the following conditions (A) and (B), and having a hydroxy group at one terminal or both terminals of a main chain of the polyether ether ketone, and
one or more selected from the group consisting of glass fibers and carbon fibers:

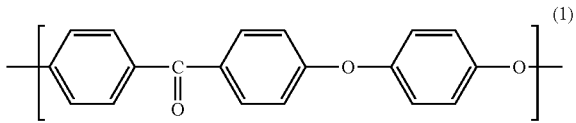

(1)

(A) a fluorine atom content a is less than 2 mg/kg; and
(B) a chlorine atom content b is 2 mg/kg or more,
wherein the polyether ether ketone has an area ratio of a peak at an α-position of the hydroxy group to a main chain peak in $^1$H-NMR measurement of 0.10% or more.

2. The composition according to claim 1, wherein a raw material of the polyether ether ketone comprises 4,4'-dichlorobenzophenone.

3. The composition according to claim 1, wherein the polyether ether ketone has the area ratio of the peak at the α-position of the hydroxy group to the main chain peak in $^1$H-NMR measurement of 0.10% to 2.00%.

4. The composition according to claim 1, wherein the polyether ether ketone has a reduced viscosity $\eta_{sp}/c$ of 0.40 dl/g to 1.00 dl/g.

5. The composition according to claim 1, wherein the form of the one or more selected from the group consisting of glass fibers and carbon fibers is one or more selected from the group consisting of: a chopped strand; a roving; a woven fabric; a nonwoven fabric; and a unidirectional material.

6. The composition according to claim 1, wherein the one or more selected from the group consisting of glass fibers and carbon fibers is glass fibers.

7. A sheet, comprising:
a cloth constituted by one or more selected from the group consisting of glass fibers and carbon fibers; and
a polyether ether ketone impregnated into the cloth,
wherein the polyether ether ketone comprises a repeating unit represented by the following formula (1), satisfies one or both of the following conditions (A) and (B), and has a hydroxy group at one terminal or both terminals of a main chain of the polyether ether ketone:

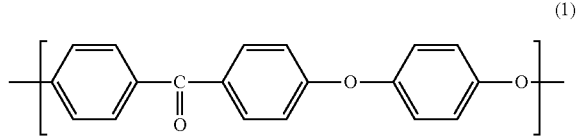

(1)

(A) a fluorine atom content a is less than 2 mg/kg; and
(B) a chlorine atom content b is 2 mg/kg or more, wherein the polyether ether ketone has an area of a peak at an α-position of the hydroxy group to a main chain peak in $^1$H-NMR measurement of 0.10% or more.

8. The sheet according to claim 7, wherein the cloth is a unidirectional material.

* * * * *